United States Patent
Sangameswaran et al.

(10) Patent No.: US 9,249,742 B2
(45) Date of Patent: Feb. 2, 2016

(54) VEHICLE AUTO-STOP CONTROL IN THE VICINITY OF AN EMERGENCY VEHICLE

(71) Applicant: FORD GLOBAL TECHNOLOGIES, LLC, Dearborn, MI (US)

(72) Inventors: Sangeetha Sangameswaran, Canton, MI (US); Mathew Alan Boesch, Plymouth, MI (US); George Edmund Walley, Novi, MI (US); John A. Lockwood, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 143 days.

(21) Appl. No.: 14/053,637

(22) Filed: Oct. 15, 2013

(65) Prior Publication Data

US 2015/0105999 A1   Apr. 16, 2015

(51) Int. Cl.
  *F02D 29/02*   (2006.01)
  *F02N 11/08*   (2006.01)
  *F02D 17/00*   (2006.01)

(52) U.S. Cl.
  CPC ............ *F02D 29/02* (2013.01); *F02D 17/00* (2013.01); *F02N 11/0837* (2013.01); *F02N 2200/12* (2013.01); *F02N 2200/123* (2013.01); *F02N 2200/125* (2013.01)

(58) Field of Classification Search
  CPC .................. F02D 29/02; F02D 41/042; F02D 2041/0095; F02D 41/065; F02D 41/06; G08G 1/0965
  USPC ............. 701/112, 2, 115, 51, 53, 65, 70, 123, 701/102, 117, 300; 123/179.3, 179.4
  See application file for complete search history.

(56) References Cited

U.S. PATENT DOCUMENTS 4,747,064 A * 5/1988 Johnston ..................... 702/176
5,629,689 A * 5/1997 Curwood ............. G08G 1/0965
                                                        340/7.5

(Continued)

FOREIGN PATENT DOCUMENTS

DE     3019709 A1   6/1980
JP  2004232557 A2   8/2004
JP  2006057456 A2   3/2006

OTHER PUBLICATIONS

Wikipedia, "Emergency Vehicles", Apr. 10, 2008.*

(Continued)

*Primary Examiner* — Stephen K Cronin
*Assistant Examiner* — Susan E Scharpf
(74) *Attorney, Agent, or Firm* — David B. Kelley; Brooks Kushman P.C.

(57) ABSTRACT

A stop/start vehicle includes an engine and a stop/start system that selectively prevents an auto stop or auto start of the engine in response to a detected vehicle proximity and direction of travel relative to an emergency vehicle. The stop/start system may be programmed to prevent an auto stop of the engine in response to a detected proximity to an emergency vehicle where the emergency vehicle is traveling in the same direction as the stop/start vehicle, or in response to a detected proximity to an emergency vehicle where the stop/start vehicle is located within an intersection. The stop start system may also be programmed to prevent an auto start of the engine in response to the engine being stopped, and further in response to a detected proximity to an emergency vehicle where the emergency vehicle is traveling in cross traffic relative to the stop/start vehicle.

9 Claims, 3 Drawing Sheets

(56) References Cited

U.S. PATENT DOCUMENTS

| | | | |
|---|---|---|---|
| 5,745,581 A * | 4/1998 | Eatwell | H03H 17/0251 381/71.11 |
| 6,675,094 B2 | 1/2004 | Russell et al. | |
| 6,856,919 B1 * | 2/2005 | Bastian et al. | 702/40 |
| 6,900,740 B2 * | 5/2005 | Bloomquist | G08G 1/096716 340/905 |
| 6,941,218 B2 | 9/2005 | Wolf et al. | |
| 7,349,797 B2 | 3/2008 | Donnelly et al. | |
| 7,650,864 B2 | 1/2010 | Hassan et al. | |
| 7,681,546 B2 * | 3/2010 | Lecole | F02D 41/22 123/179.3 |
| 8,095,291 B2 | 1/2012 | Christen et al. | |
| 8,392,066 B2 * | 3/2013 | Ehara et al. | 701/41 |
| 8,498,802 B2 * | 7/2013 | Yamamoto | F02D 29/02 701/112 |
| 8,532,843 B2 * | 9/2013 | Nagura et al. | 701/2 |
| 8,594,912 B2 | 11/2013 | Weaver | |
| 8,904,984 B2 | 12/2014 | Hanft et al. | |
| 2004/0233045 A1 * | 11/2004 | Mays | 340/425.5 |
| 2005/0239436 A1 | 10/2005 | Bell et al. | |
| 2006/0277495 A1 | 12/2006 | Obradovich | |
| 2008/0266052 A1 * | 10/2008 | Schmid | 340/5.1 |
| 2009/0171547 A1 | 7/2009 | Hyde et al. | |
| 2010/0070128 A1 * | 3/2010 | Johnson | G08G 1/096783 701/31.4 |
| 2010/0125402 A1 * | 5/2010 | Bansal et al. | 701/117 |
| 2010/0152963 A1 * | 6/2010 | Heckel et al. | 701/34 |
| 2010/0168992 A1 | 7/2010 | Nakata | |
| 2011/0005486 A1 | 1/2011 | Nakamura | |
| 2011/0256981 A1 * | 10/2011 | Saito et al. | 477/183 |
| 2011/0288743 A1 * | 11/2011 | Smith | 701/102 |
| 2012/0010797 A1 * | 1/2012 | Luo et al. | 701/70 |
| 2013/0035839 A1 | 2/2013 | Otanez et al. | |
| 2014/0005914 A1 * | 1/2014 | Bernzen | 701/112 |
| 2014/0081561 A1 | 3/2014 | Be et al. | |
| 2014/0136041 A1 * | 5/2014 | Malone et al. | 701/22 |
| 2014/0257678 A1 | 9/2014 | Boesch et al. | |
| 2014/0257679 A1 | 9/2014 | Boesch et al. | |
| 2014/0343830 A1 * | 11/2014 | Elwart et al. | 701/112 |

OTHER PUBLICATIONS

Office Action mailed Dec. 31, 2014 for U.S. Appl. No. 13/793,570, filed Mar. 11, 2013.

Office Action mailed Dec. 30, 2014 for U.S. Appl. No. 14/053,722, filed Oct. 15, 2013.

* cited by examiner

US 9,249,742 B2

VEHICLE AUTO-STOP CONTROL IN THE VICINITY OF AN EMERGENCY VEHICLE

TECHNICAL FIELD

This disclosure relates to stop/start vehicles and controlling stop/start activities while the stop/start vehicle is proximate an emergency vehicle.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped rather than permitting the engine to idle. The engine may be restarted when the driver releases the brake or actuates the accelerator.

SUMMARY

A method for controlling a stop/start vehicle includes selectively preventing an auto stop or auto start of the engine in response to a detected vehicle location, vehicle proximity to an emergency vehicle, and direction of travel relative to an emergency vehicle. The method may include preventing an auto stop of the engine when the emergency vehicle is traveling in the same direction as the stop/start vehicle and the stop/start vehicle is in the path of the emergency vehicle. The method may include preventing an auto stop in response to a detected vehicle location within an intersection when the emergency vehicle is proximate. The method may include overriding a commanded auto stop inhibition in response to a detected proximity to an emergency vehicle in which the emergency vehicle is traveling in cross traffic relative to the stop/start vehicle. Detecting the vehicle proximity to an emergency vehicle may comprise optically detecting a flashing light indicative of an emergency vehicle. In an alternative embodiment, detecting the vehicle proximity to an emergency vehicle may comprise detecting a traffic light status, where the traffic light broadcasts a traffic light status including the activation of a traffic light preemption signal.

A stop/start vehicle includes an engine and a stop/start system programmed to selectively prevent an auto stop or auto start of the engine in response to a detected vehicle proximity relative to an emergency vehicle and direction of travel relative to an emergency vehicle. The stop/start system may be programmed to prevent an auto stop of the engine when the direction of travel relative to the emergency vehicle is such that the emergency vehicle is traveling in a same direction as the stop/start vehicle and the stop/start vehicle is in the path of the emergency vehicle. The stop/start system may also be programmed to prevent an auto stop in response to a detected vehicle location in an intersection when the emergency vehicle is proximate. The stop start system may also be programmed to override a commanded inhibition of the auto stop function in response to a detected proximity to an emergency vehicle in which the emergency vehicle is traveling in cross traffic relative to the stop/start vehicle. Detecting the vehicle proximity to an emergency vehicle may comprise optically detecting a flashing light indicative of an emergency vehicle. In an alternative embodiment, detecting the vehicle proximity to an emergency vehicle comprises detecting a traffic light status, where the traffic light broadcasts a traffic light status including the activation of a traffic light preemption signal.

A stop/start vehicle includes an engine and a stop/start system programmed to prevent an auto stop of the engine in response to a detected vehicle proximity relative to an emergency vehicle and direction of travel relative to the emergency vehicle, in which the emergency vehicle is traveling in a same direction as the stop/start vehicle and the stop/start vehicle is in the path of the emergency vehicle. The stop/start system may also be programmed to detect the vehicle proximity to the emergency vehicle based on a signal indicative of a flashing light of the emergency vehicle. The stop/start system may additionally be programmed to detect the vehicle proximity to the emergency vehicle based on a signal indicative of a traffic light preemption broadcast.

Embodiments according to the present disclosure provide a number of advantages. For example, the present disclosure provides a stop/start vehicle having control logic to prevent an engine auto stop and enable a driver to pull aside and make way for an emergency vehicle. As another example, the present disclosure provides a stop/start vehicle having control logic to prevent an auto start until an emergency vehicle has passed in cross traffic, preventing unnecessary engine starts.

The above advantages and other advantages and features of the present disclosure will be readily apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with a stop/start system controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By disabling the engine when possible, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
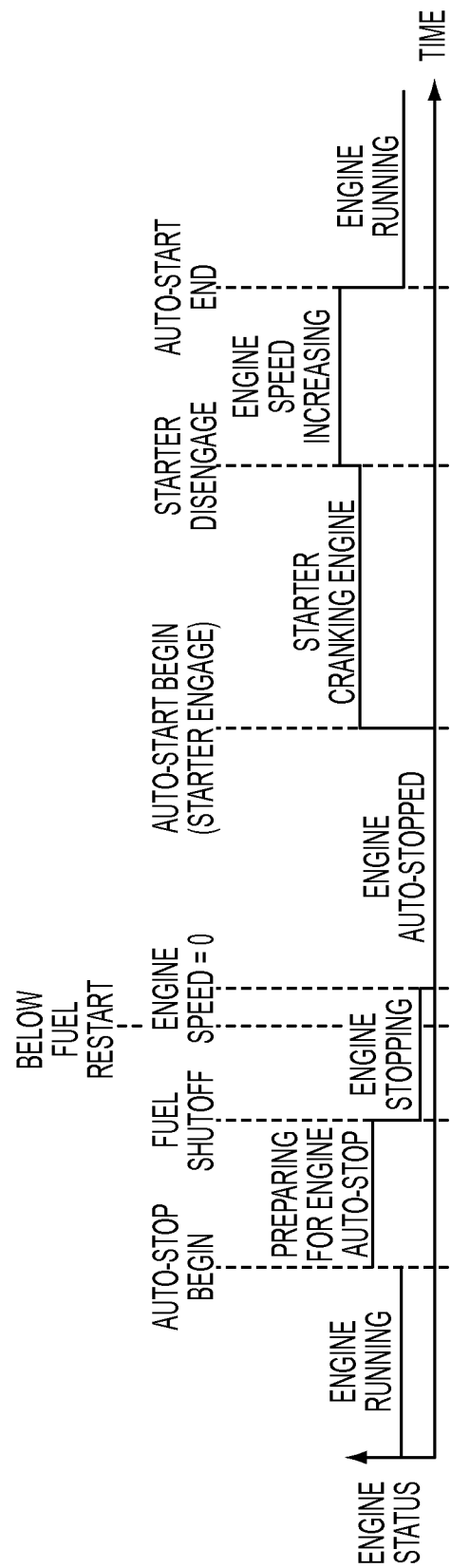
FIG. 1 is a plot illustrating engine status during an auto-stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

In stop/start vehicles, the stop/start system may automatically shut down the engine in order to save fuel, and at a later time automatically restart the engine. However, in certain situations it is undesirable for the engine to automatically stop or automatically start according to the base logic. For example, when an emergency vehicle approaches the stop/start vehicle traveling in the same direction (i.e. approaching from behind or the front), an engine auto stop may delay a driver's ability to pull aside out of the emergency vehicle's path. Similarly, if an emergency vehicle approaches the stop/start vehicle while the stop/start vehicle is located in an intersection, an engine auto stop may delay the driver's ability to pull aside or otherwise move out of the intersection. As yet another example, if the engine in a stop/start vehicle has been auto stopped and an emergency vehicle approaches the stop/start vehicle from the side, as may occur when the stop/start vehicle is stopped at an intersection and the emergency vehicle approaches the intersection in cross traffic, then an engine auto start is unnecessary as the driver will desire to wait until the emergency vehicle has passed through the intersection before resuming travel.

Certain systems and methods disclosed herein may provide an improved stop/start control configuration for an engine having auto-stop functionality. A controller may utilize inputs from a variety of sensors to determine whether and from which direction an emergency vehicle is approaching. If a determination is made that an emergency vehicle is approaching and traveling in the same direction as the stop/start vehicle, then the controller may prevent the engine from automatically shutting down. If a determination is made that an emergency vehicle is approaching and the stop/start vehicle is located within an intersection, then the controller may prevent the engine from automatically shutting down. If a determination is made that an emergency vehicle is approaching and traveling in cross traffic relative to the stop/start vehicle, then the controller may prevent the engine from automatically restarting.

Figure 2:
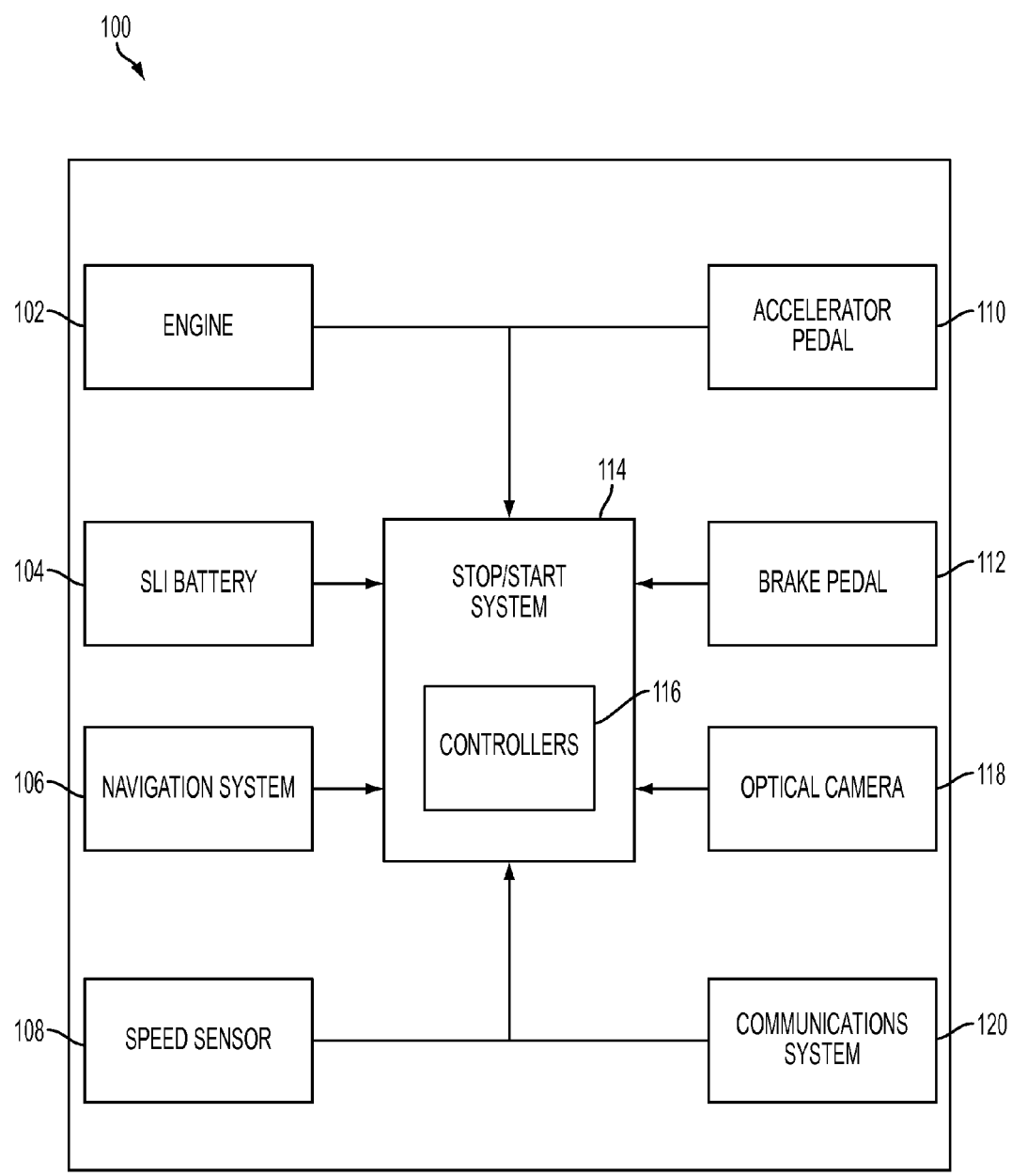
FIG. 2 is a block diagram of a stop/start vehicle.

With reference to FIG. 2, a schematic representation of a vehicle 100 having auto-stop functionality is shown. The vehicle 100 includes an engine 102, an SLI battery 104, a navigation system 106, a speed sensor 108, an accelerator pedal 110, and a brake pedal 112. The vehicle further includes a stop/start system 114 including at least one controller 116, an optical camera 118, and a communications system 120. The engine 102, SLI battery 104, navigation system 106, speed sensor 108, accelerator pedal 110, brake pedal 112, optical camera 118, and communications system 120 are all in communication with or under the control of the stop/start system 114, as indicated by thin solid line. In one configuration, the navigation system 106 may be an in-vehicle GPS or aGPS system. aGPS, or Assisted GPS, modules utilize cellular communications data to improve the time to fix a location. In another configuration, the navigation system 106 may comprise a location-enabled mobile device such as a cellular phone or standalone GPS unit. Other configurations are, of course, also possible.

The at least one controller 116 may issue auto-stop commands and auto-start commands to the engine 102 during vehicle operation. The stop/start system 114, for example, comprises a base auto-stop/start logic that issues auto-stop commands and auto-start commands—to achieve, among other things, stages similar to that described with reference to FIG. 1—based on signals from at least the speed sensor 108, accelerator pedal 110, and brake pedal 112. In short, the engine 102 will be shut down in response to an auto-stop command and will be restarted in response to an auto-start command.

Figure 3:
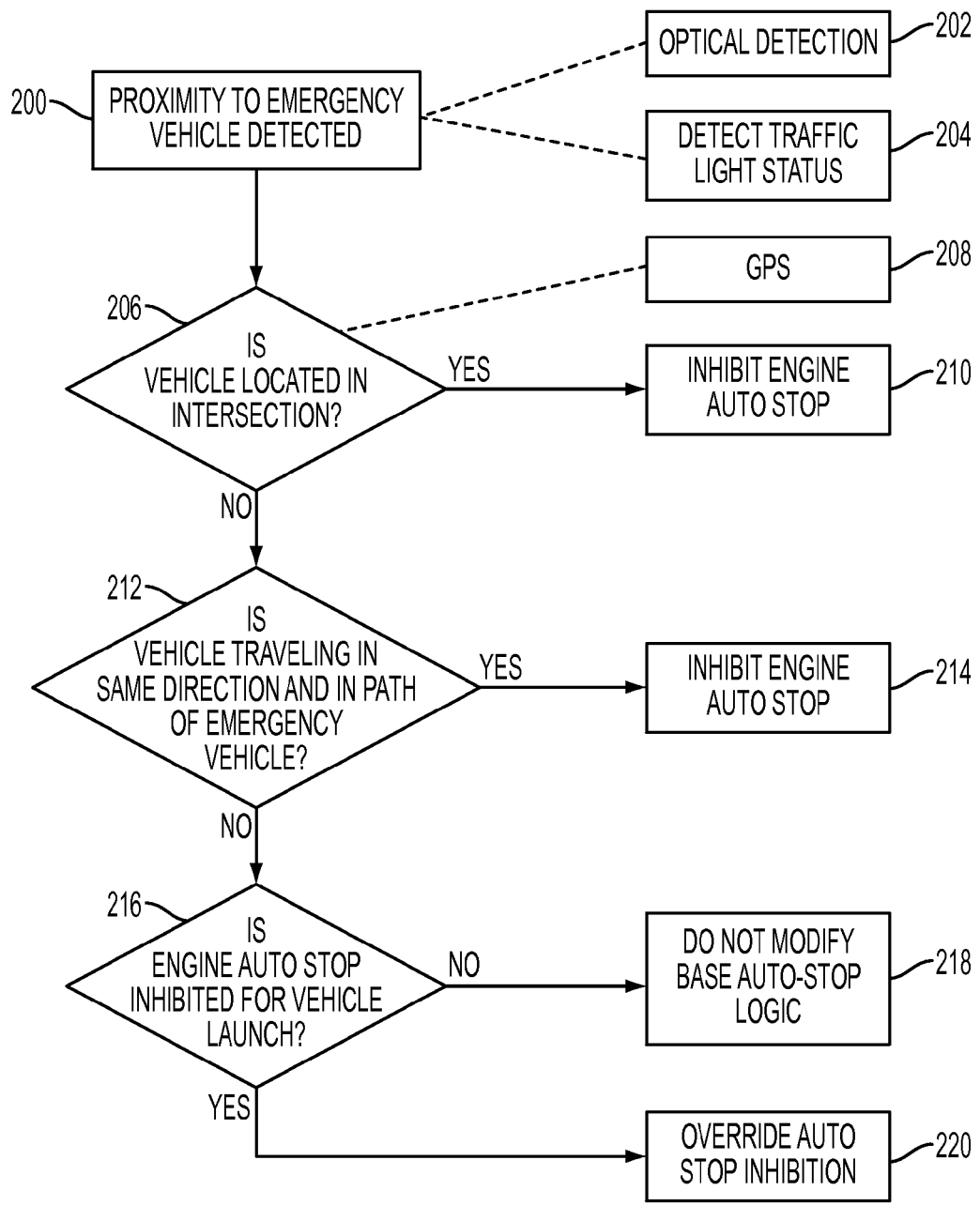
FIG. 3 is a flowchart illustrating an algorithm for controlling a start/stop vehicle.

In one embodiment described with reference to FIGS. 2 and 3, a proximity to an emergency vehicle is detected, as illustrated in block 200. As an example, this detection may be performed by optical recognition, as illustrated in block 202. Controller 116 may receive input from optical camera 118 indicative of a flashing light such as is used to indicate emergency vehicles. This flashing light may be a light attached to an emergency vehicle, a light on a stoplight that flashes when an emergency vehicle approaches the intersection, or other light as appropriate. As another example, a traffic light status may be detected, as indicated in block 204. Traffic light status may be detected in situations where the traffic light is equipped to broadcast the traffic light status and the emergency vehicle has "captured" the traffic light. Controller 116 may receive input from communications system 120 indicative of the traffic light status. A determination is then made of whether the vehicle is located in an intersection, as illustrated in operation 206. This determination may be made based on GPS data, as illustrated in block 208. Controller 116 may receive input from navigation system 106 indicative of the stop/start vehicle's location in an intersection. If a determination is made that the stop/start vehicle is located in an intersection, then the engine auto stop function is disabled, as illustrated in block 210. The stop/start vehicle's engine will not be auto stopped, enabling the vehicle to pull through the intersection and not block the emergency vehicle. If the stop/start vehicle is not located in an intersection, then a determination is made of whether the stop/start vehicle is traveling in the same direction as, and in the path of, the emergency vehicle, as illustrated in operation 212. This determination may be made in response to various inputs including optical recognition and detection of traffic light status, as described above with respect to block 200. If a determination is made that the stop/start vehicle is traveling in the same direction as the emergency vehicle and in the path of the emergency vehicle, then the engine auto stop function is disabled until the emergency vehicle has passed, as illustrated at block 214. If a determination is made that the stop/start vehicle is not traveling in the same direction as the emergency vehicle, i.e. is in cross-traffic relative to the emergency vehicle, then a determination is made of whether the auto stop function is being inhibited in preparation for a vehicle launch, as illustrated at operation 216. This may occur, for example, if the stop/start vehicle is in a turning lane. In such a situation, the auto stop function may be inhibited to enable a rapid vehicle launch. If a determination is made that the auto stop function is not inhibited for a vehicle launch, then the base auto-stop logic is left unmodified, as illustrated at block 218. If the auto stop function is inhibited for other reasons, such as to maintain a battery state of charge, that inhibition is left unmodified. If a determination is made that the auto stop function is inhibited for a vehicle launch, then the auto-start function is prevented until the emergency vehicle has passed, as illustrated at block 220.

The following example is provided for illustrative purposes. A vehicle having a stop/start system according to the present disclosure drives down the road and is approached from behind by an emergency vehicle. In such situations, traffic frequently slows as vehicles begin to pull to the side of the road to make way for the emergency vehicle, in response to which the base stop/start logic may generally command an auto stop. The stop/start vehicle optically detects the proximate emergency vehicle, determines that the vehicle is not in an intersection, determines that the stop/start vehicle is traveling in the same direction as, and in the path of, the emergency vehicle, and disables the engine auto stop function. In this example, the engine may thus continue running so that the driver may pull off to the side of the road to make way for the emergency vehicle.

In another example, a vehicle having a stop/start system according to the present disclosure is stopped in a turn lane at a traffic light. The stop/start system inhibits the auto-stop function in preparation for a quick launch when a break in traffic appears. An emergency vehicle approaches the intersection in cross traffic and "captures" the traffic light. The stop/start vehicle detects the proximate emergency vehicle in response to a signal broadcast by the traffic light, determines that the vehicle is not located in an intersection, determines that the stop/start vehicle is not traveling in the same direction as the emergency vehicle, determines that the auto stop function is inhibited, and overrides the inhibition of the auto stop function. In this example, the engine may thus be auto stopped until the emergency vehicle has passed and "released" the traffic light, avoiding unnecessary engine running time.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a stop/start vehicle comprising:
   selectively preventing an auto stop of an engine in response to a detected stop/start vehicle location, stop/start vehicle proximity to a target vehicle having a flashing light, and direction of travel relative to the target vehicle such that the target vehicle is traveling in a same direction as the stop/start vehicle and the stop/start vehicle is in the path of the target vehicle.

2. The method of claim 1, further comprising detecting the stop/start vehicle proximity to the target vehicle, wherein the detecting comprises optically detecting a flashing light of the target vehicle.

3. The method of claim 1, further comprising detecting the stop/start vehicle proximity to the target vehicle, wherein the detecting comprises detecting a traffic light preemption broadcast.

4. A stop/start vehicle comprising:
   an engine; and
   a stop/start system programmed to selectively prevent an auto stop of the engine in response to a detected stop/start vehicle proximity relative to a target vehicle having a flashing light, a detected stop/start vehicle location in an intersection when the target vehicle is proximate, and direction of travel relative to the target vehicle.

5. The stop/start vehicle of claim 4, wherein the stop/start system is further programmed to override a commanded inhibition of the engine auto stop in response to a detected proximity to a second target vehicle having a flashing light in which the second target vehicle is traveling in cross traffic relative to the stop/start vehicle.

6. The stop/start vehicle of claim 4, wherein the stop/start system is further programmed to detect the stop/start vehicle proximity to the target vehicle based on a signal indicative of the flashing light of the target vehicle.

7. The stop/start vehicle of claim 4, wherein the stop/start system is further programmed to detect the stop/start vehicle proximity to the target vehicle based on a signal indicative of a traffic light preemption broadcast.

8. A stop/start vehicle comprising:
   an engine; and
   a stop/start system programmed to prevent an auto stop of the engine in response to a detected stop/start vehicle proximity relative to a target vehicle having a flashing light and a detected direction of travel relative to the target vehicle in which the target vehicle is traveling in a same direction as the stop/start vehicle and the stop/start vehicle is in the path of the target vehicle.

9. The stop/start vehicle of claim 8, wherein the stop/start system is further programmed to detect the stop/start vehicle proximity to the target vehicle based on a signal indicative of a traffic light preemption broadcast.

\* \* \* \* \*